(12) United States Patent
Sato

(10) Patent No.: US 7,054,072 B2
(45) Date of Patent: May 30, 2006

(54) ZOOM LENS SYSTEM

(75) Inventor: Makoto Sato, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 4 days.

(21) Appl. No.: 11/045,467

(22) Filed: Jan. 27, 2005

(65) Prior Publication Data

US 2005/0168831 A1    Aug. 4, 2005

(30) Foreign Application Priority Data

Jan. 30, 2004 (JP) ............................. 2004-023315
Sep. 24, 2004 (JP) ............................. 2004-273613
Sep. 24, 2004 (JP) ............................. 2004-276311

(51) Int. Cl.
*G02B 15/14* (2006.01)

(52) U.S. Cl. ...................... 359/680; 359/691

(58) Field of Classification Search ......... 359/676–692
See application file for complete search history.

(56) References Cited

U.S. PATENT DOCUMENTS 5,668,669 A * 9/1997 Ohtake et al. ............... 359/684
6,862,143 B1 * 3/2005 Hoshi et al. ................. 359/689

FOREIGN PATENT DOCUMENTS

JP    2003-57542 A    2/2003

\* cited by examiner

*Primary Examiner*—Georgia Epps
*Assistant Examiner*—M. Hasan
(74) *Attorney, Agent, or Firm*—Frishauf, Holtz, Goodman & Chick, P.C.

(57) ABSTRACT

A zoom lens includes (i) a negative first lens group having a negative meniscus first lens element and a positive meniscus second lens element; and (ii) a positive second lens group having a positive third lens element, a positive fourth lens element, a negative fifth lens element which is cemented to the positive fourth lens element, and a sixth lens element having a weaker refractive power. Zooming is performed by moving the first lens group and the second lens group along the optical axis. The zoom lens system satisfies $TL/f_W < 1.9$; and $0.6 < f_W/f_{II} < 0.77$, wherein TL is the sum of the length of the first lens group and that of the second lens group; $f_W$ is the combined focal length of the zoom lens at the wide-angle extremity; and $f_{II}$ is the focal length of the second lens group.

9 Claims, 10 Drawing Sheets

WIDE-ANGLE EXTREMITY

WIDE-ANGLE EXTREMITY

TELEPHOTO EXTREMITY

WIDE-ANGLE EXTREMITY
LONGITUDINAL SPHERICAL ABER.
- - - c (656.2725 nm)
——— d (587.5618 nm)
-·- e (435.8343 nm)

WIDE-ANGLE EXTREMITY
ASTIGMATIC FIELD CURVES

WIDE-ANGLE EXTREMITY
DISTORTION

TELEPHOTO EXTREMITY
LONGITUDINAL SPHERICAL ABER.
- - - c (656.2725 nm)
——— d (587.5618 nm)
-·- e (435.8343 nm)

TELEPHOTO EXTREMITY
ASTIGMATIC FIELD CURVES

TELEPHOTO EXTREMITY
DISTORTION

WIDE-ANGLE EXTREMITY

LONGITUDINAL SPHERICAL ABER.

WIDE-ANGLE EXTREMITY

ASTIGMATIC FIELD CURVES

WIDE-ANGLE EXTREMITY

DISTORTION

TELEPHOTO EXTREMITY

LONGITUDINAL SPHERICAL ABER.

TELEPHOTO EXTREMITY

ASTIGMATIC FIELD CURVES

TELEPHOTO EXTREMITY

DISTORTION

WIDE-ANGLE EXTREMITY

TELEPHOTO EXTREMITY

WIDE-ANGLE EXTREMITY

LONGITUDINAL SPHERICAL ABER.

WIDE-ANGLE EXTREMITY

ASTIGMATIC FIELD CURVES

WIDE-ANGLE EXTREMITY

DISTORTION

TELEPHOTO EXTREMITY

LONGITUDINAL SPHERICAL ABER.

TELEPHOTO EXTREMITY

ASTIGMATIC FIELD CURVES

TELEPHOTO EXTREMITY

DISTORTION

WIDE-ANGLE EXTREMITY

TELEPHOTO EXTREMITY

WIDE-ANGLE EXTREMITY
LONGITUDINAL SPHERICAL ABER.

WIDE-ANGLE EXTREMITY
ASTIGMATIC FIELD CURVES

WIDE-ANGLE EXTREMITY
DISTORTION

TELEPHOTO EXTREMITY
LONGITUDINAL SPHERICAL ABER.

TELEPHOTO EXTREMITY
ASTIGMATIC FIELD CURVES

TELEPHOTO EXTREMITY
DISTORTION

WIDE-ANGLE EXTREMITY

TELEPHOTO EXTREMITY

WIDE-ANGLE EXTREMITY
LONGITUDINAL SPHERICAL ABER.

ASTIGMATIC FIELD CURVES

DISTORTION

TELEPHOTO EXTREMITY
LONGITUDINAL SPHERICAL ABER.

TELEPHOTO EXTREMITY
ASTIGMATIC FIELD CURVES

TELEPHOTO EXTREMITY
DISTORTION

ZOOM LENS SYSTEM

BACKGROUND OF THE INVENTION

1. Field of the Invention

The present invention relates to a high-performance zoom lens system which is used in a small imaging apparatus employing an image sensor, such as a CCD (charged coupled device), which has been utilized in a digital still camera and the like.

2. Description of the Prior Art

In recent years, various kinds of zoom lens systems which have been used in imaging apparatus of digital still cameras have been proposed. For example, by effectively providing at least one aspherical lens surface (hereinafter, an aspherical surface) made of a resin material, a compact zoom lens system having a high resolution and minimum amount of distortion, and having a small number of lens elements has been known in the art, e.g., as disclosed in Japanese Unexamined Patent Publication No. 2003-057542.

However, the zoom lens system explained above has room for improvement, if an attempt is made to apply such a zoom lens system to an imaging device of a thin digital still camera. Namely, the overall length of the conventional zoom lens system is too long during use and even in a fully retracted state.

SUMMARY OF THE INVENTION

The present invention provides an inexpensive zoom lens system which has a high resolution and minimum distortion, and which is compact during use and also in a retracted state, by effectively providing at least one aspherical surface.

According to an aspect of the present invention, there is provided a zoom lens system including a first lens group and a second lens group, in this order from the object.

The first lens group has a negative refractive power (hereinafter, a negative first lens group), and includes a first lens element formed as a negative meniscus lens element having the convex surface facing toward the object (hereinafter, a negative meniscus first lens element), and a second lens element formed as a positive meniscus lens element having the convex surface facing toward the object (hereinafter, a positive meniscus second lens element), in this order from the object.

The second lens group has a positive refractive power (hereinafter, a positive second lens group), and includes a third lens element formed as a positive lens element having a smaller radius of curvature on the object-side surface thereof (hereinafter, a positive third lens element), a fourth lens element formed as a positive lens element (hereinafter, a positive fourth lens element), a fifth lens element formed as a negative lens element (hereinafter, a negative fifth lens element) which is cemented to the positive fourth lens element so that the positive fourth lens element and the negative fifth lens element constitute a cemented lens elements, and a sixth lens element having a weaker refractive power which is the weakest refractive power among those of other lens elements in the positive second lens group, in this order from the object.

Zooming is performed by moving the negative first lens group and the positive second lens group along the optical axis of the zoom lens system.

The zoom lens system satisfies the following conditions with respect to the length thereof along the optical axis:

$$TL/f_W < 1.9 \quad (1)$$

$$0.6 < f_W/f_{II} < 0.77 \quad (2)$$

wherein

TL designates the sum of the length of the negative first lens group (the distance between the most object-side surface and the most image-side surface of the negative first lens group) and that of the positive second lens group (the distance between the most object-side surface and the most image-side surface of the positive second lens group);

$f_W$ designates the combined focal length of the zoom lens system at the wide-angle extremity; and $f_{II}$ designates the focal length of the positive second lens group.

Condition (1) specifies the overall length of the zoom lens system when the lens barrel thereof is in a full-retracted position.

If the upper limit of condition (1) is exceeded, it becomes difficult to achieve sufficient miniaturization of the zoom lens system.

Condition (2) specifies the refractive-power distribution to each lens group for the purpose of achieving both miniaturization of the zoom lens system and higher optical performance thereof with an appropriate refractive power.

If the upper limit of condition (2) is exceeded, the refractive power of the zoom lens system becomes excessively stronger, so that the optical performance deteriorates.

If the lower limit of condition (2) is exceeded, the overall size of the zoom lens system increases.

In regard to the negative first lens group, the negative first lens element thereof preferably satisfies the following condition with respect to the refractive power of the negative first lens element:

$$-1.1 < f_W/f_1 < -0.8 \quad (3)$$

wherein $f_W$ designates the combined focal length of the zoom lens system at the wide-angle extremity; and $f_1$ designates the focal length of the negative first lens element.

The negative first lens element and the positive second lens element of the negative first lens group preferably satisfies the following conditions with respect to the lens materials thereof:

$$10 < v_1 - v_2 \quad (4)$$

$$1.66 < n_2 \quad (5)$$

wherein $v_1$ designates the Abbe number of the negative first lens element;

$v_2$ designates the Abbe number of the positive second lens element; and $n_2$ designates the refractive index, with respect to the d-line, of the positive second lens element.

The negative first lens element of the negative first lens group preferably satisfies the following condition with respect to the image-side surface of the negative first lens element:

$$1.16 < f_W/R_2 < 1.51 \quad (6)$$

wherein $f_W$ designates the combined focal length of the zoom lens system at the wide-angle extremity; and $R_2$ designates the radius of curvature of the image-side surface of the negative first lens element.

Condition (3) relates to the suitable refractive-power distribution to the negative first lens group. In other words, due to this condition, the overall size of the zoom lens system and the conditions for suitably correcting aberrations can be balanced.

If the lower limit of condition (3) is exceeded, the negative refractive power of the negative first lens group becomes stronger. Consequently, the positive refractive power of the positive second lens group has to make stronger. As a result, maintaining the balance between aberrations becomes difficult, and the optical performance of the zoom lens system deteriorates.

If the upper limit of condition (3) is exceeded, the distance between the negative first lens group and the positive second lens group has to be made longer. Consequently, the size of the zoom lens system becomes larger, which is inappropriate for a compact digital still camera.

Condition (4) relates to the correcting of chromatic aberration.

If the lower limit of condition (4) is exceeded, the correcting of chromatic aberration by the negative first lens element is not sufficiently be made, so that it becomes difficult to correct chromatic aberration within the negative first lens group.

Condition (5) relates to the correcting of field curvature.

If the lower limit of condition (5) exceeded, the Petzval sum becomes larger, and field curvature is not be sufficiently corrected.

Condition (6) specifies the image-side concave surface, formed with a larger curvature, of the negative first lens element of the negative first lens group. By providing a curvature within the range of condition (6), the image-side surface of the negative first lens element can be concentrically formed with respect to the entrance pupil. Due to this arrangement, the occurrence of aberrations substantially decreases.

If the upper limit of condition (6) is exceeded, the radius of curvature of the image-side surface of the negative first lens element becomes too small, so that machining thereof becomes difficult. Moreover, the negative refractive power becomes too strong, so that the Petzval sum becomes too small.

If the lower limit of condition (6) is exceeded, it is advantageous for machining the image-side surface of the negative first lens element; however, the concentricity thereof with respect to the entrance pupil deteriorates, and the correcting of distortion and field curvature becomes difficult.

The image-side surface of the negative first lens element is preferably formed as an aspherical surface.

In regard to the positive second lens group, the positive third lens element thereof preferably satisfies the following conditions with respect to the lens materials thereof:

$$29.7 < (\nu_3 + \nu_4)/2 - \nu_5 \quad (7)$$

$$1.45 < (n_3 + n_4)/2 < 1.78 \quad (8)$$

wherein $\nu_3$ designates the Abbe number of the positive third lens element;

$\nu_4$ designates the Abbe number of the positive fourth element;

$n_3$ designates the refractive index, with respect to the d-line, of the positive third lens element; and $n_4$ designates the refractive index, with respect to the d-line, of the positive fourth lens element.

The positive third lens element of the positive second lens group preferably satisfies the following condition with respect to the refractive power thereof:

$$0.5 < f_W/f_3 < 0.85 \quad (9)$$

wherein $f_W$ designates the combined focal length of the zoom lens system at the wide-angle extremity; and $f_3$ designates the focal length of the positive third lens element.

The positive third lens element of the positive second lens group preferably satisfies the following condition with respect to the object-side surface of the positive third lens element:

$$0.8 < f_W/R_5 < 1.45 \quad (10)$$

wherein $f_W$ designates the combined focal length of the zoom lens system at the wide-angle extremity; and $R_5$ designates the radius of curvature of the object-side surface of the positive third lens element.

The positive third lens element and the negative fifth lens element of the negative second lens group preferably satisfy the following condition with respect to the object-side surface of the positive third lens element and the image-side surface of the negative fifth lens element:

$$0.75 < R_5/R_9 < 1.45 \quad (11)$$

wherein $R_5$ designates the radius of curvature of the object-side surface of the positive third lens element: and $R_9$ designates the radius of curvature of the image-side surface of the negative fifth lens element.

Condition (7) is for suitably correcting chromatic aberration.

If the lower limit of condition (7) is exceeded, the correcting of chromatic aberration becomes difficult.

Condition (8) relates to the correcting of field curvature.

If condition (8) is not satisfied, the Petzval sum becomes an inappropriate value. Consequently, field curvature is not adequately corrected.

Condition (9) specifies the suitable refractive-power distribution to the positive third lens element. In other words, due to this condition, the overall size of the zoom lens system and the conditions for suitably correcting aberrations are balanced.

If condition (9) is not satisfied, the positive refractive power of the positive third lens element becomes stronger. Consequently, the negative refractive power of the negative first lens group has to make stronger. As a result, maintaining the balance between aberrations becomes difficult, and the optical performance of the zoom lens system deteriorates.

Condition (10) is for correcting under-corrected spherical aberration due to the positive third lens element having a strong positive refractive power, and for miniaturizing the positive second lens group by constituting the positive second lens group as a telephoto-type lens system.

If the upper limit of condition (10) is exceeded, it is advantageous for miniaturization of the zoom lens system; however, the optical performance deteriorates.

If the lower limit of condition (10) is exceeded, the optical performance of the zoom lens system can be improved; however, it becomes difficult to miniaturize the zoom lens system.

Condition (11) is for correcting spherical aberration and coma. In other words, a concentric plane is necessary with respect to the incident bundle of light rays, since a thick bundle of axial light rays and a thick bundle of off-axis light rays are made incident on the positive second lens group.

If condition (11) is not satisfied, it becomes difficult to concentrically position the object-side surface of the positive third lens element and the image-side surface of the negative fifth lens element. Consequently, spherical aberration and coma become larger; and therefore the correcting of both spherical aberration and coma are not adequately be made.

Furthermore, at least two lens surfaces of the positive second lens group are preferably formed as aspherical surfaces. Also, the negative fifth lens element is preferably made of transparent ceramics.

The present disclosure relates to subject matter contained in Japanese Patent Application Nos. 2004-23315 (filed on Jan. 30, 2004), 2004-276310 (filed on Sep. 24, 2004), and 2004-276311 (filed on Sep. 24, 2004) which are expressly incorporated herein in their entireties.

BRIEF DESCRIPTION OF THE DRAWINGS

The present invention will be discussed below in detail with reference to the accompanying drawings, in which.

DESCRIPTION OF THE PREFERRED EMBODIMENTS

The present invention will be described with the following embodiments. In the first though fifth embodiments, the zoom lens system includes a negative first lens group LG1 and a positive second: lens group LG2, in this order from the object.

The negative first lens group LG1 includes a negative meniscus first lens element L1 having the convex surface facing toward the object and a positive meniscus second lens element L2 having the convex surface facing toward the object.

The positive second lens group LG2 includes a positive third lens element L3 whose object-side surface has a smaller radius of curvature, a positive fourth lens element L4, a negative fifth lens element L5 and a sixth lens element L6 having a weaker refractive power which is the weakest refractive power among those of other lens elements in the positive second lens group.

Here, note that the positive fourth lens element L4 and the negative fifth lens element L5 are cemented to each other to constitute cemented lens elements.

Furthermore, at least one plane-parallel glass plate LP is provided between the most image-side surface of the positive second lens group LG2 and an imaging plane IP. The plane-parallel glass plate LP actually includes at least one of, or the combination of, a CCD cover glass, a crystal filter and a infrared absorption filter; however, in the illustrated first through fifth embodiments, the plane-parallel glass plate LP is depicted as a single element, for clarity, the thickness of which is shown to correspond to the actual thickness of the plane-parallel glass plate LP.

In regard to an aspherical surface which is utilized in each embodiment, the aspherical surface, as well known in the art, is generally defined by the following aspherical formula, assuming that the Z axis extends along the optical axis direction, and the Y axis extends along a direction perpendicular to the optical axis:

$$Z=(Y^2/r)[1+\{1-(1+K)(Y/r)^2\}^{1/2}]+A_4Y^4+A_6Y^6+A_8Y^8+A_{10}Y^{10}..$$

Namely, the aspherical surface is a curved surface obtained by rotating the curved line defined by the above formula about the optical axis.

The shape of the aspherical surface is defined by a paraxial radius of curvature r, a conic constant K, and higher-order aspherical surface coefficients $A_4$, $A_6$, $A_8$ and $A_{10}$.

[Embodiment 1]

Figure 1A:
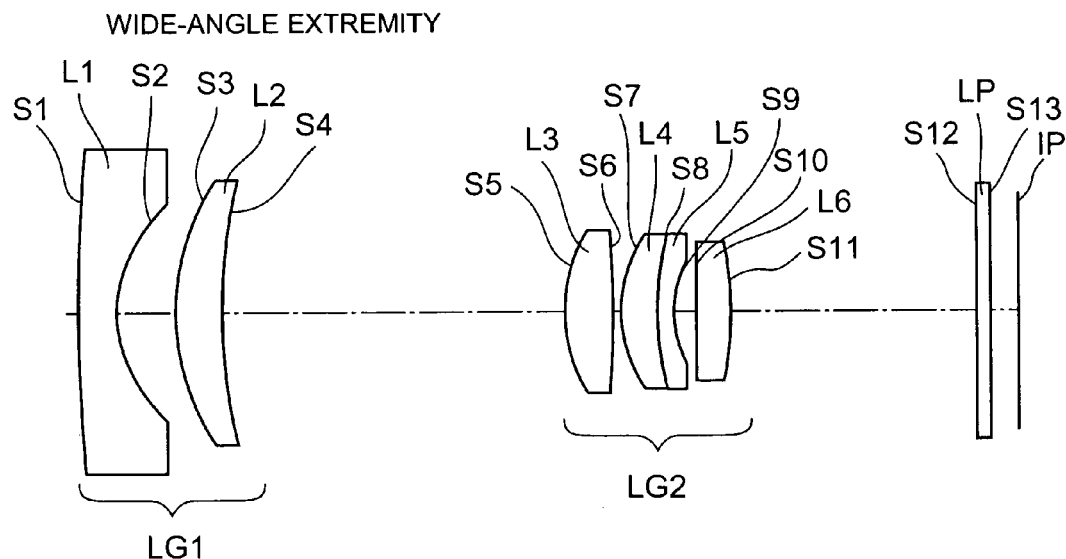
FIG. 1A shows a lens arrangement of a zoom lens system at the wide-angle extremity, according to a first embodiment of the present invention.
Figure 1B:
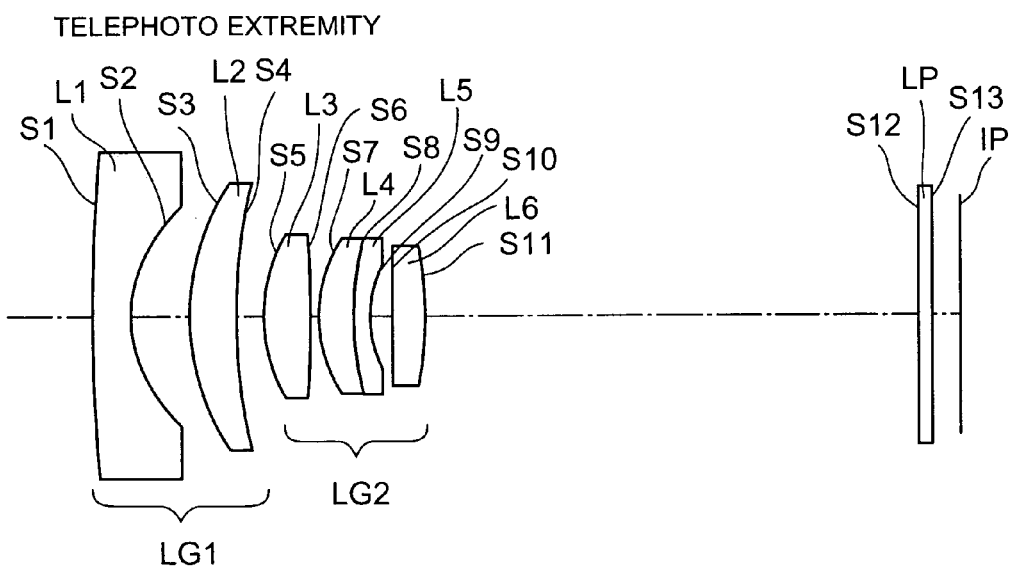
FIG. 1B shows a lens arrangement of the zoom lens system at the telephoto extremity, according to the first embodiment of the present invention.
Figure 2A:
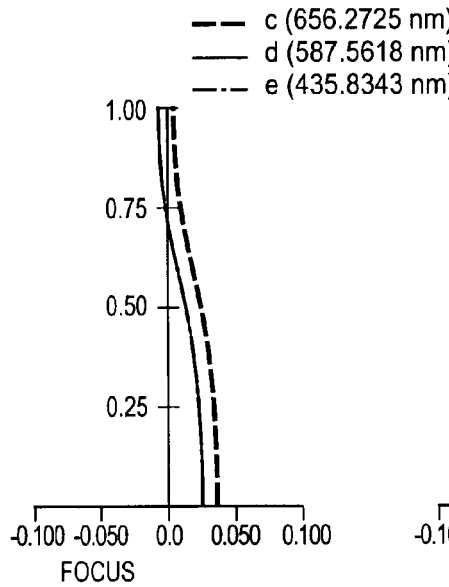
FIGS. 2A, 2B, 2C, 2D, 2E and 2F show various aberrations occurred in the zoom lens system of the first embodiment.
Figure 2B:
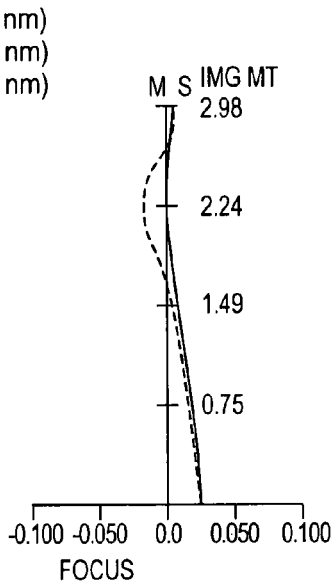
Figure 2C:
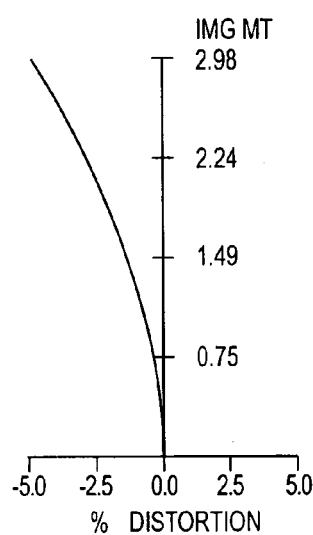
Figure 2D:
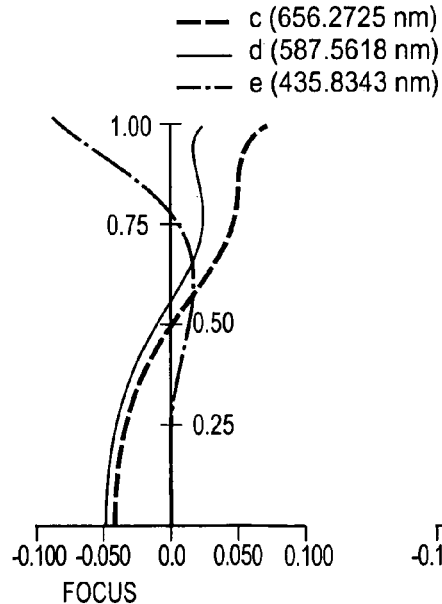
Figure 2E:
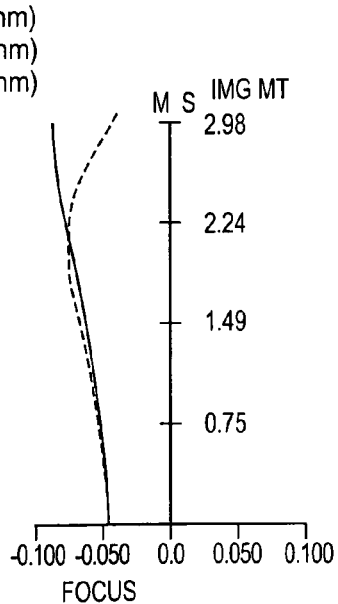
Figure 2F:
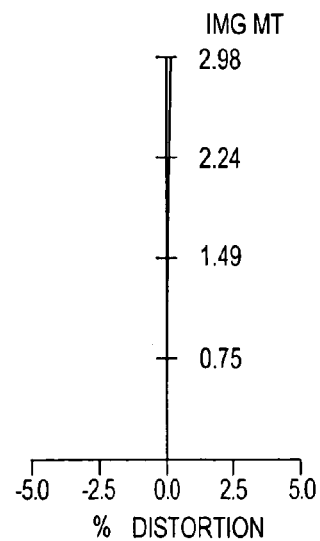

The numerical values of the first embodiment are shown in Table 1. FIG. 1A shows a lens arrangement of the zoom lens system at the wide-angle extremity. FIG. 1B shows a lens arrangement of the zoom lens system at the telephoto extremity. FIGS. 2A, 2B, 2C, 2D, 2E and 2F show various aberrations occurred in the zoom lens system of the first embodiment.

In the tables, f designates the focal length of the entire zoom lens system, $F_{NO}$ designates the f-number, $2\omega$ designates the whole angle of view (°), and $b_f$ designates the back focal distance. The back focal distance $b_f$ is the reduced distance from the image-side surface of the sixth lens element L6 of the positive second lens group LG2 to the imaging plane IP. Furthermore, R designates the radius of curvature, D designates the lens thickness or distance between lens elements, $n_d$ designates the refractive index with respect to the d-line, and $v_d$ designates the Abbe number.

In the aberration diagrams, d, g, and C designate aberration curves at their respective wavelengths. Furthermore, in the diagrams of astigmatic field curvature, S and M designate sagittal and meridional, respectively.

The symbols in the tables and diagrams herein explained can also be applied to the second through fifth embodiments.

TABLE 1 f = 5.00~8.24~13.50
$F_{NO}$ = 3.22~4.04~5.39
$2\omega$ = 64.3°~40.1°~24.8°
$b_f$ = 7.523~10.049~14.201

| Surf. No. | R | D | $n_d$ | $v_d$ |
|---|---|---|---|---|
| 1 | 47.8657 | 1.000 | 1.80025 | 40.8 |
| 2* | 3.6748 | 1.557 | — | — |
| 3 | 6.6658 | 1.268 | 1.84666 | 23.785 |
| 4 | 15.1935 | 9.180~3.900~0.725 | | |
| 5* | 4.0754 | 1.264 | 1.56907 | 71.315 |
| 6* | −34.1334 | 0.212 | — | — |
| 7 | 4.1351 | 0.967 | 1.62041 | 60.344 |

TABLE 1-continued f = 5.00~8.24~13.50
$F_{NO}$ = 3.22~4.04~5.39
2ω = 64.3°~40.1°~24.8°
$b_f$ = 7.523~10.049~14.201

| Surf. No. | R | D | $n_d$ | $v_d$ |
|---|---|---|---|---|
| 8 | 9.9538 | 0.400 | 2.08165 | 30.288 |
| 9 | 3.1948 | 0.585 | — | — |
| 10 | 66.3961 | 0.904 | 1.67407 | 55 |
| 11* | −11.3711 | 6.578~9.104~13.255 | | |
| 12 | ∞ | 0.380 | 1.54892 | 69.759 |
| 13 | ∞ | 0.700 | — | — |

*designates the aspherical surface which is rotationally symmetrical with respect to the optical axis.

Aspherical surface data (the aspherical surface coefficients not indicated are zero (0.00)):

| Surf. No. | K | $A_4$ | $A_6$ | $A_8$ | $A_{10}$ |
|---|---|---|---|---|---|
| 2 | −3.4886 | $7.3110 \times 10^{-3}$ | $-4.7308 \times 10^{-4}$ | $3.2015 \times 10^{-5}$ | $-1.0426 \times 10^{-6}$ |
| 5 | −1.096 | 0.0000 | $2.5755 \times 10^{-4}$ | $-7.7718 \times 10^{-5}$ | $-1.0822 \times 10^{-7}$ |
| 6 | −13.769 | $-7.7187 \times 10^{-4}$ | $3.4108 \times 10^{-4}$ | $-1.4188 \times 10^{-4}$ | $7.4981 \times 10^{-6}$ |
| 11 | 8.00044 | $2.0569 \times 10^{-3}$ | $3.8219 \times 10^{-4}$ | $-6.9746 \times 10^{-5}$ | $2.8466 \times 10^{-5}$ |

[Embodiment 2]

Figure 3A:
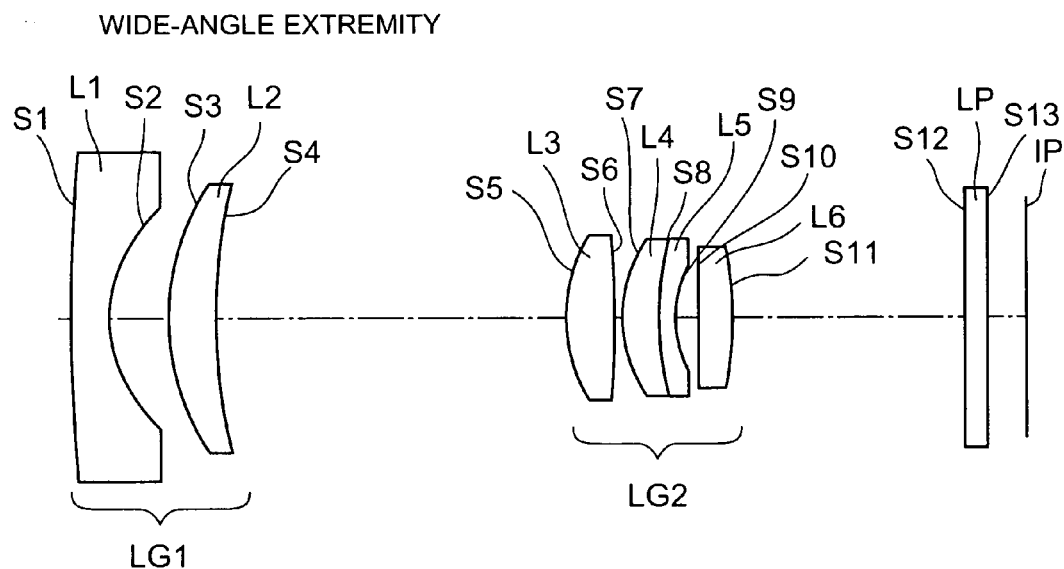
FIG. 3A shows a lens arrangement of the zoom lens system at the wide-angle extremity, according to a second embodiment of the present invention.
Figure 3B:
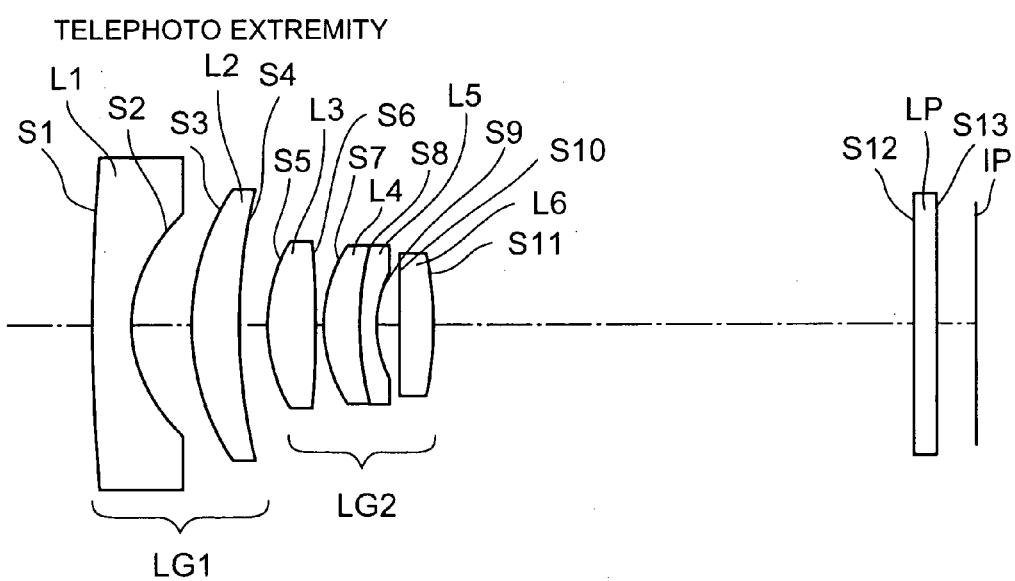
FIG. 3B shows a lens arrangement of the zoom lens system at the telephoto extremity, according to the second embodiment of the present invention.
Figure 4A:
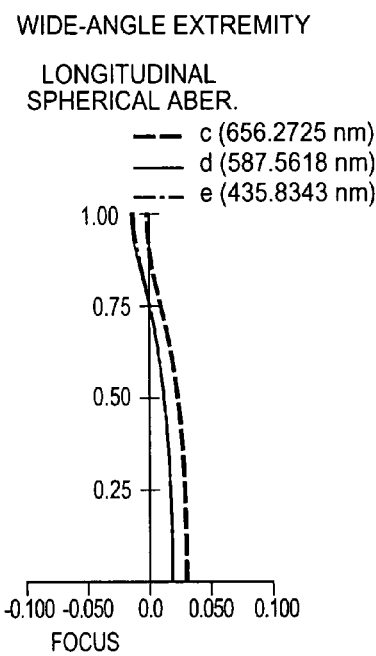
FIGS. 4A, 4B, 4C, 4D, 4E and 4F show various aberrations occurred in the zoom lens system of the second embodiment.
Figure 4B:
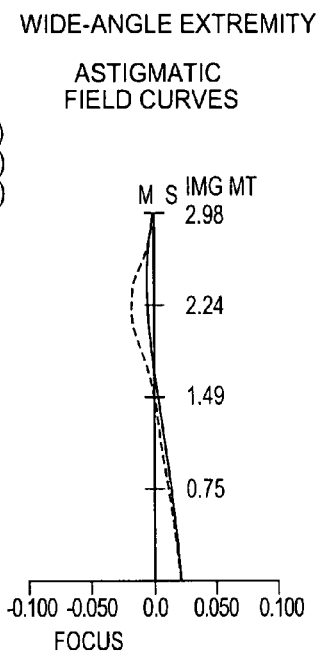
Figure 4C:
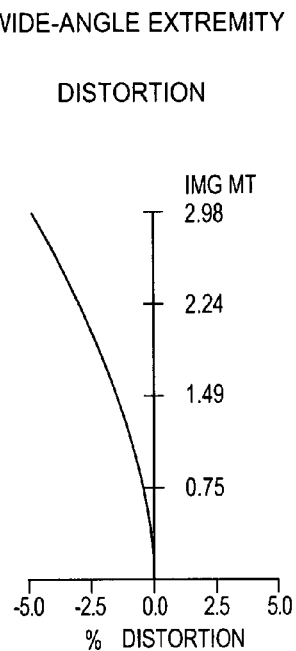
Figure 4D:
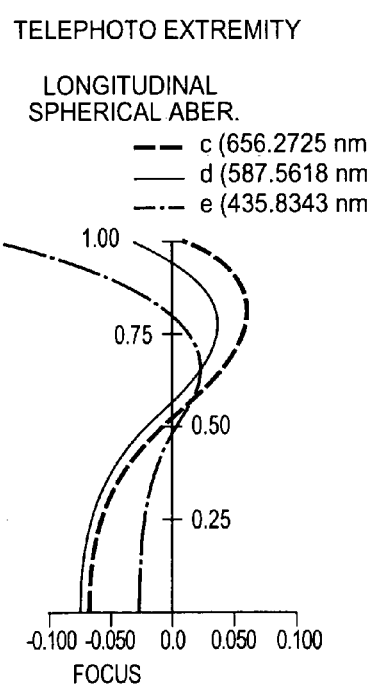
Figure 4E:
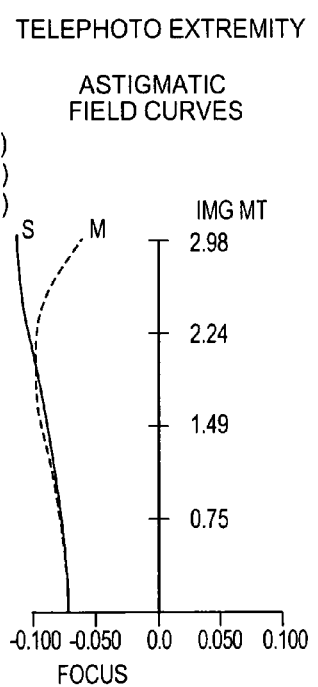
Figure 4F:
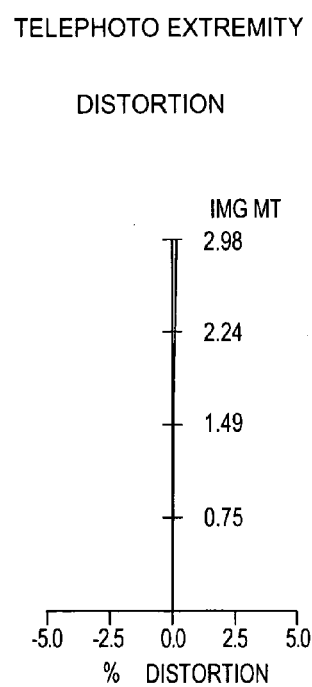

The numerical values of the second embodiment are shown in Table 2. FIG. 3A shows a lens arrangement of the zoom lens system at the wide-angle extremity. FIG. 3B shows a lens arrangement of the zoom lens system at the telephoto extremity. FIGS. 4A, 4B, 4C, 4D, 4E and 4F show various aberrations occurred in the zoom lens system of the second embodiment.

TABLE 2 f = 4.98~8.23~13.46
$F_{NO}$ = 3.2~4.0~5.4
2ω = 64.5°~40.2°~24.9°
$b_f$ = 7.530~10.069~14.225

| Surf. No. | R | D | $n_d$ | $v_d$ |
|---|---|---|---|---|
| 1 | 47.866 | 1 | 1.80025 | 40.8 |
| 2* | 3.675 | 1.54 | — | — |
| 3 | 6.652 | 1.289 | 1.84666 | 23.785 |
| 4 | 15.106 | 9.186~3.900~0.741 | | |
| 5* | 4.059 | 1.264 | 1.56627 | 71.32 |
| 6* | −33.691 | 0.212 | — | — |
| 7 | 4.176 | 0.96 | 1.62041 | 60.344 |
| 8 | 9.893 | 0.4 | 2.08165 | 30.288 |
| 9 | 3.221 | 0.59 | — | — |
| 10 | 65.849 | 0.904 | 1.67407 | 55 |
| 11* | −11.371 | 6.086~8.625~12.781 | | |
| 12 | ∞ | 0.591 | 1.5 | 64 |
| 13 | ∞ | 1.05 | — | — |

TABLE 2-continued f = 4.98~8.23~13.46
$F_{NO}$ = 3.2~4.0~5.4
2ω = 64.5°~40.2°~24.9°
$b_f$ = 7.530~10.069~14.225

| Surf. No. | R | D | $n_d$ | $v_d$ |
|---|---|---|---|---|

*designates the aspherical surface which is rotationally symmetrical with respect to the optical axis.

Aspherical surface data (the aspherical surface coefficients not indicated are zero (0.00)):

| Surf. No. | K | $A_4$ | $A_6$ | $A_8$ | $A_{10}$ |
|---|---|---|---|---|---|
| 2 | −3.4886 | $7.3110 \times 10^{-3}$ | $-4.7308 \times 10^{-4}$ | $3.2016 \times 10^{-5}$ | $-1.0426 \times 10^{-6}$ |
| 5 | −1 | $-7.4662 \times 10^{-5}$ | $1.8056 \times 10^{-4}$ | $-2.9815 \times 10^{-5}$ | $-7.4888 \times 10^{-6}$ |
| 6 | 16.4777 | $-5.4804 \times 10^{-4}$ | $2.8592 \times 10^{-4}$ | $-9.7459 \times 10^{-5}$ | $-9.7829 \times 10^{-7}$ |
| 11 | 8.00044 | $2.0569 \times 10^{-3}$ | $3.8219 \times 10^{-4}$ | $-6.9746 \times 10^{-5}$ | $2.8466 \times 10^{-5}$ |

[Embodiment 3]

Figure 5A:
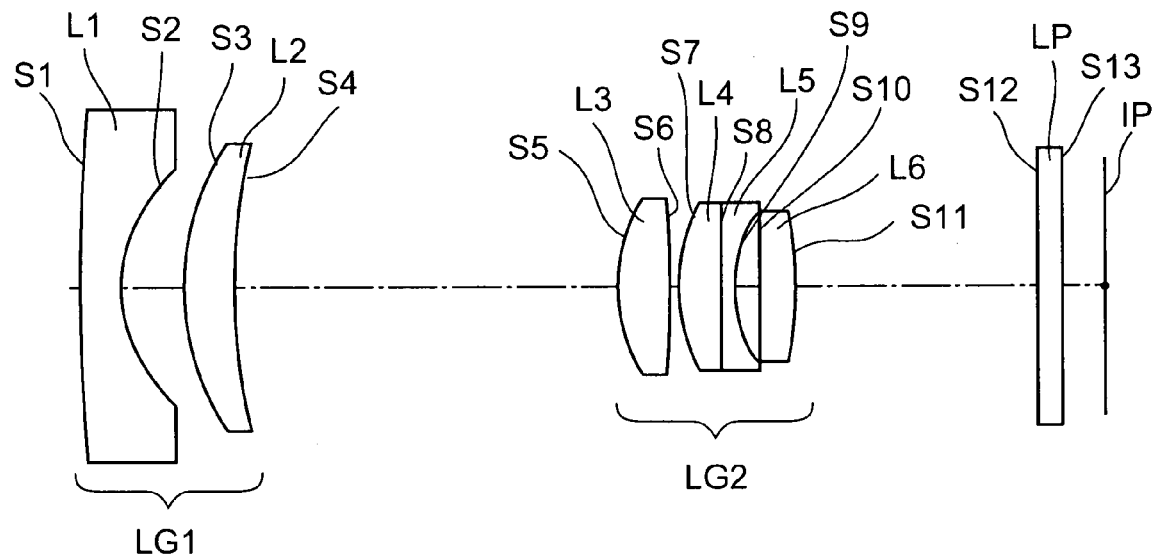
FIG. 5A shows a lens arrangement of the zoom lens system at the wide-angle extremity, according to a third embodiment of the present invention.
Figure 5B:
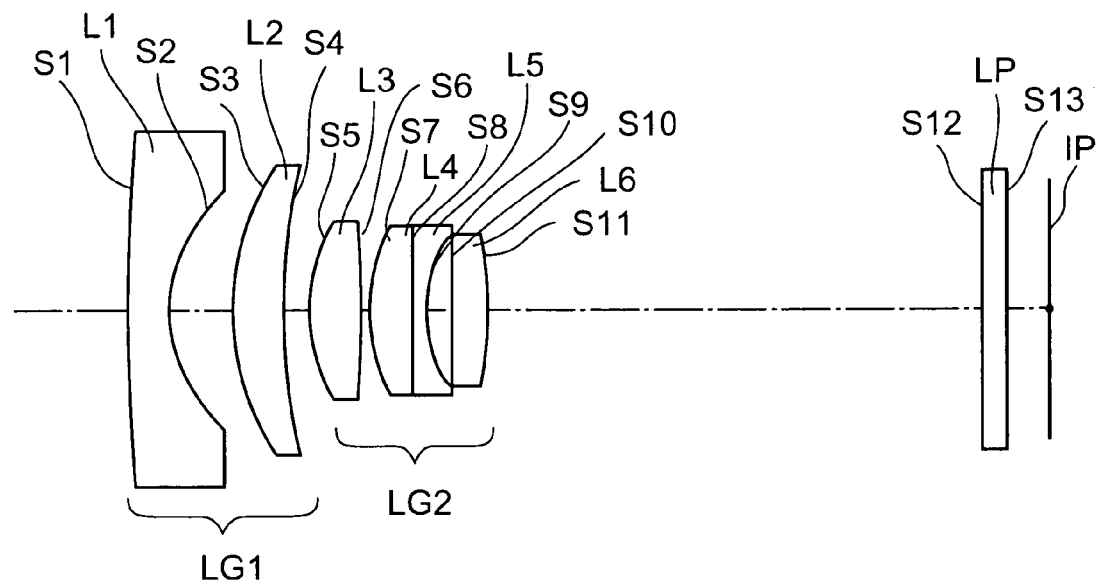
FIG. 5B shows a lens arrangement of the zoom lens system at the telephoto extremity, according to the third embodiment of the present invention.
Figure 6A:
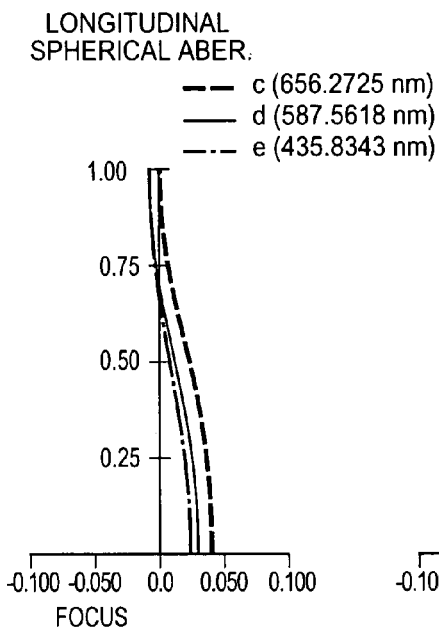
FIGS. 6A, 6B, 6C, 6D, 6E and 6F show various aberrations occurred in the zoom lens system of the third embodiment.
Figure 6B:
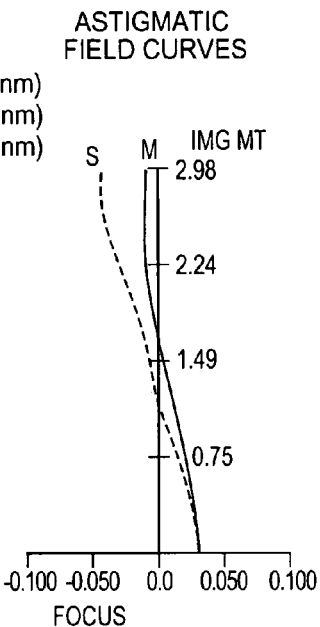
Figure 6C:
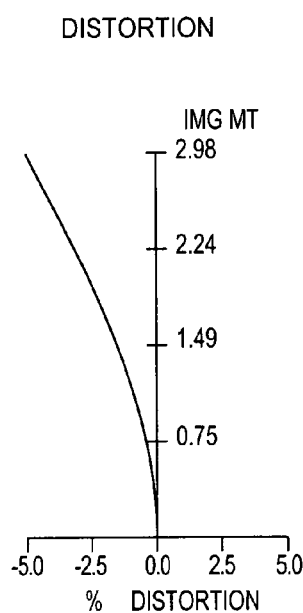
Figure 6D:
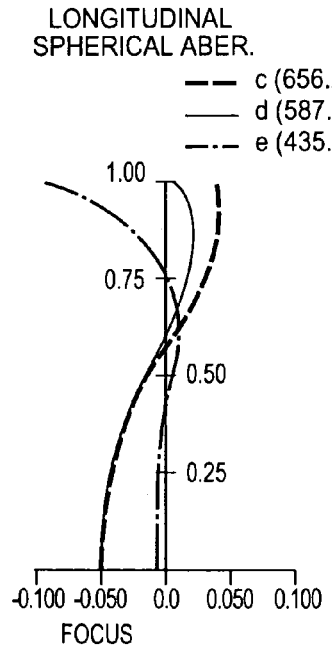
Figure 6E:
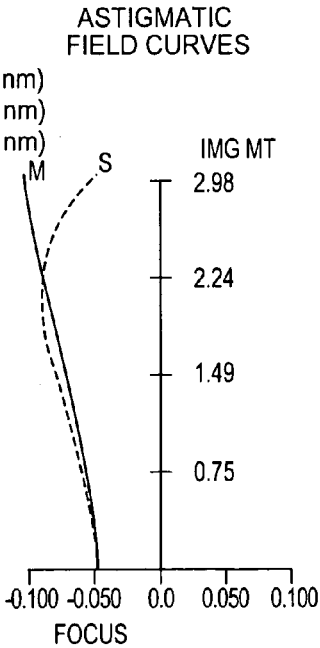
Figure 6F:
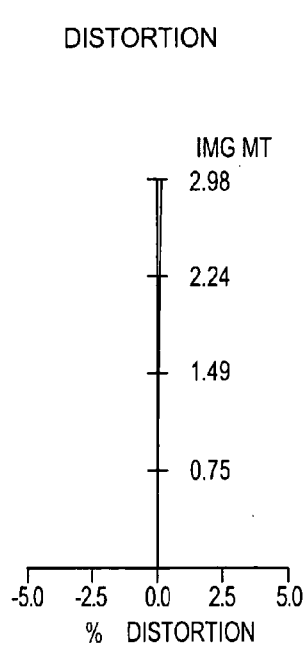

The numerical values of the third embodiment are shown in Table 3. FIG. 5A shows a lens arrangement of the zoom lens system at the wide-angle extremity. FIG. 5B shows a lens arrangement of the zoom lens system at the telephoto extremity. FIGS. 6A, 6B, 6C, 6D, 6E and 6F show various aberrations occurred in the zoom lens system of the third embodiment.

TABLE 3 f = 4.83~8.07~13.05
$F_{NO}$ = 3.11~3.89~5.11
2ω = 66.22°~40.82°~25.62°
$b_f$ = 7.253~9.723~13.574

| Surf. No. | R | D | $n_d$ | $v_d$ |
|---|---|---|---|---|
| 1 | 35.5771 | 1.000 | 1.80025 | 40.80 |
| 2* | 3.6598 | 1.523 | — | — |
| 3 | 6.3478 | 1.264 | 1.84666 | 23.79 |
| 4 | 13.0856 | 9.464~3.900~0.725 | | |
| 5* | 4.2369 | 1.258 | 1.56627 | 71.32 |
| 6* | −28.4172 | 0.150 | — | — |
| 7 | 4.1515 | 1.083 | 1.48749 | 70.44 |
| 8 | −139.1604 | 0.400 | 1.80610 | 33.27 |
| 9 | 3.6852 | 0.609 | — | — |

TABLE 3-continued f = 4.83~8.07~13.05
$F_{NO}$ = 3.11~3.89~5.11
2ω = 66.22°~40.82°~25.62°
$b_f$ = 7.253~9.723~13.574

| Surf. No. | R | D | $n_d$ | $v_d$ |
|---|---|---|---|---|
| 10 | −49.5235 | 0.872 | 1.67407 | 55.00 |
| 11* | −10.2360 | 5.809~8.279~12.130 | — | — |
| 12 | ∞ | 0.591 | 1.50000 | 64.00 |
| 13 | ∞ | 1.050 | — | — |

*designates the aspherical surface which is rotationally symmetrical with respect to the optical axis.

Aspherical surface data (the aspherical surface coefficients not indicated are zero (0.00)):

| Surf. No. | K | $A_4$ | $A_6$ | $A_8$ | $A_{10}$ |
|---|---|---|---|---|---|
| 2 | −3.4886 | $7.3110 \times 10^{-3}$ | $-4.7308 \times 10^{-4}$ | $3.2015 \times 10^{-5}$ | $-1.0426 \times 10^{-6}$ |
| 5 | −1.096 | 0.0000 | $2.5755 \times 10^{-4}$ | $-7.7718 \times 10^{-5}$ | $-1.0822 \times 10^{-7}$ |
| 6 | −13.769 | $-7.7187 \times 10^{-4}$ | $3.4108 \times 10^{-4}$ | $-1.4188 \times 10^{-4}$ | $7.4981 \times 10^{-6}$ |
| 11 | 8.00044 | $2.0569 \times 10^{-3}$ | $3.8219 \times 10^{-4}$ | $-6.9746 \times 10^{-5}$ | $2.8466 \times 10^{-5}$ |

[Embodiment 4]

Figure 7A:
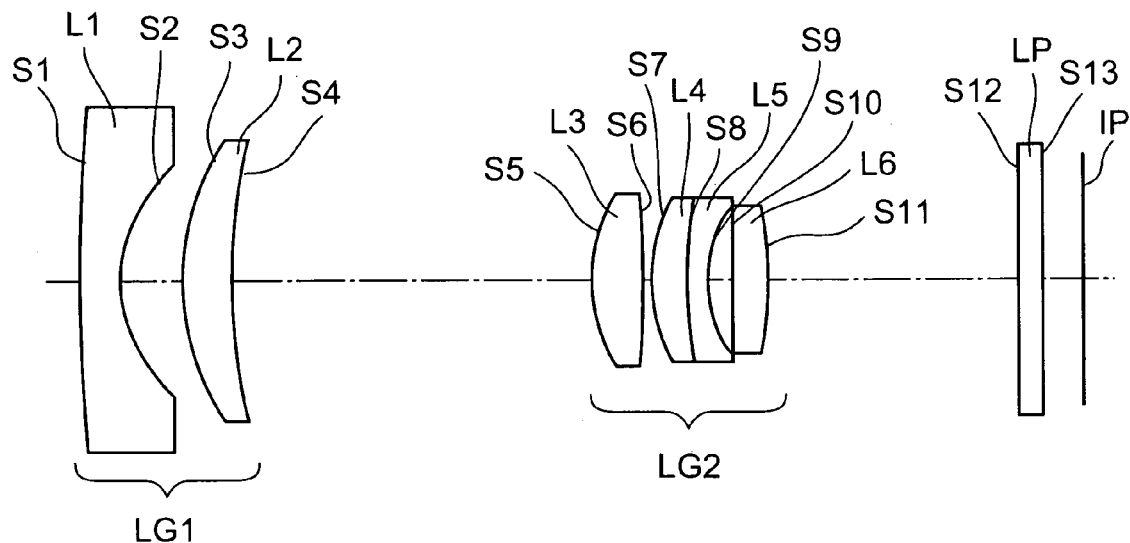
FIG. 7A shows a lens arrangement of the zoom lens system at the wide-angle extremity, according to a fourth embodiment of the present invention.
Figure 7B:
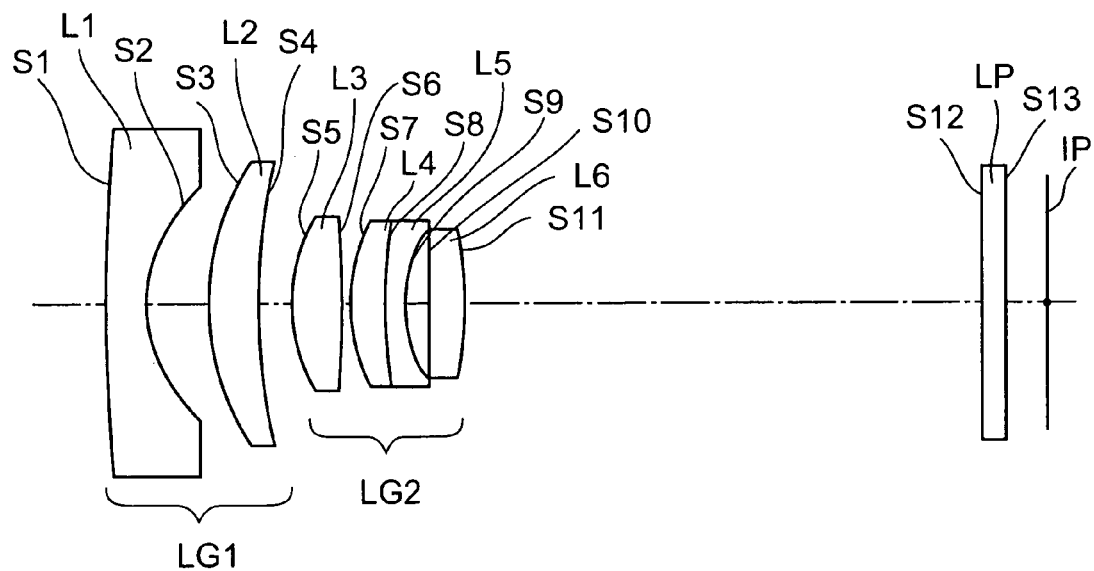
FIG. 7B shows a lens arrangement of the zoom lens system at the telephoto extremity, according to the fourth embodiment of the present invention.
Figure 8A:
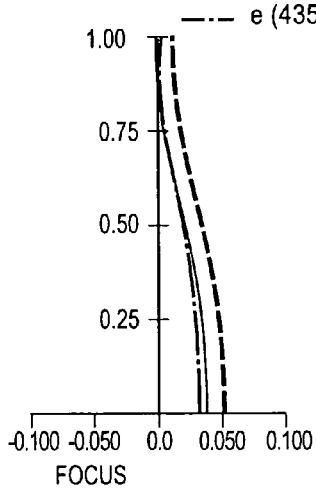
FIGS. 8A, 8B, 8C, 8D, 8E and 8F show various aberrations occurred in the zoom lens system of the fourth embodiment.
Figure 8B:
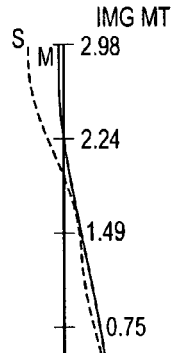
Figure 8C:
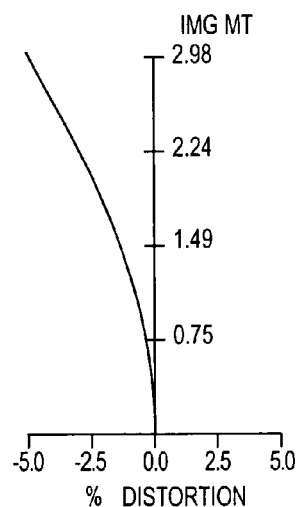
Figure 8D:
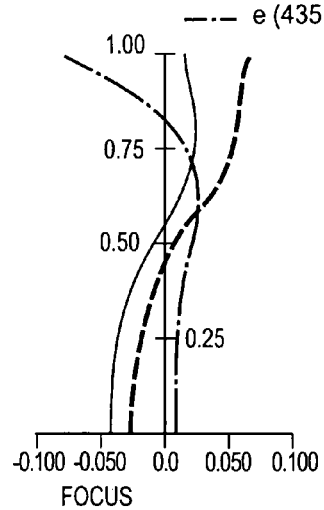
Figure 8E:
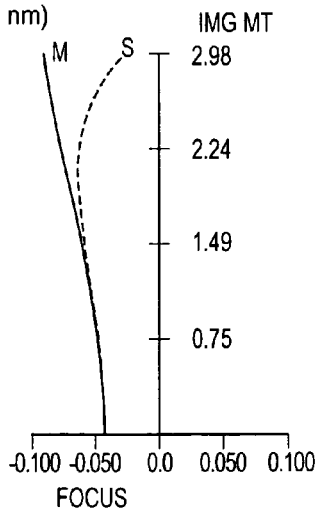
Figure 8F:
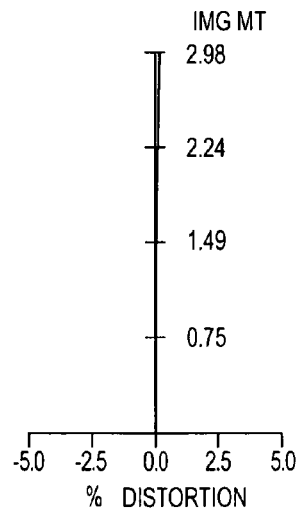

The numerical values of the fourth embodiment are shown in Table 4. FIG. 7A shows a lens arrangement of the zoom lens system at the wide-angle extremity. FIG. 7B shows a lens arrangement of the zoom lens system at the telephoto extremity. FIGS. 8A, 8B, 8C, 8D, 8E and 8F show various aberrations occurred in the zoom lens system of the fourth embodiment.

TABLE 4 f = 5.06~8.27~13.65
$F_{NO}$ = 3.23~4.05~5.41
2ω = 63.88°~40.02°~24.56°
$b_f$ = 7.712~10.256~14.564

| Surf. No. | R | D | $n_d$ | $v_d$ |
|---|---|---|---|---|
| 1 | 46.0354 | 1.000 | 1.80025 | 40.80 |
| 2* | 3.6778 | 1.538 | — | — |
| 3 | 6.5423 | 1.256 | 1.84666 | 23.79 |
| 4 | 14.2401 | 9.023~3.900~0.725 | — | — |
| 5* | 4.3697 | 1.245 | 1.51680 | 64.20 |
| 6* | −26.9151 | 0.150 | — | — |
| 7 | 3.7246 | 1.043 | 1.61800 | 63.33 |
| 8 | 11.3378 | 0.458 | 1.80610 | 33.27 |
| 9 | 3.3040 | 0.538 | — | — |
| 10 | −118.4590 | 0.911 | 1.60970 | 57.74 |
| 11* | −8.4897 | 6.270~8.814~13.122 | — | — |

TABLE 4-continued f = 5.06~8.27~13.65
$F_{NO}$ = 3.23~4.05~5.41
2ω = 63.88°~40.02°~24.56°
$b_f$ = 7.712~10.256~14.564

| Surf. No. | R | D | $n_d$ | $v_d$ |
|---|---|---|---|---|
| 12 | ∞ | 0.592 | 1.50900 | 64.00 |
| 13 | ∞ | 1.050 | — | — |

*designates the aspherical surface which is rotationally symmetrical with respect to the optical axis.

Aspherical surface data (the aspherical surface coefficients not indicated are zero (0.00)):

| Surf. No. | K | $A_4$ | $A_6$ | $A_8$ | $A_{10}$ |
|---|---|---|---|---|---|
| 2 | −3.1814 | $6.5394 \times 10^{-3}$ | $-3.4373 \times 10^{-4}$ | $1.9863 \times 10^{-5}$ | $-5.4411 \times 10^{-7}$ |
| 5 | −1 | $4.1103 \times 10^{-4}$ | $1.5418 \times 10^{-4}$ | $-5.3829 \times 10^{-5}$ | $-8.1734 \times 10^{-8}$ |
| 6 | −75.584 | $-2.8092 \times 10^{-4}$ | $1.6511 \times 10^{-4}$ | $-8.8092 \times 10^{-5}$ | $3.5145 \times 10^{-6}$ |
| 11 | 3.79761 | $2.5952 \times 10^{-3}$ | $4.2350 \times 10^{-4}$ | $-3.4932 \times 10^{-5}$ | $2.2830 \times 10^{-5}$ |

[Embodiment 5]

Figure 9A:
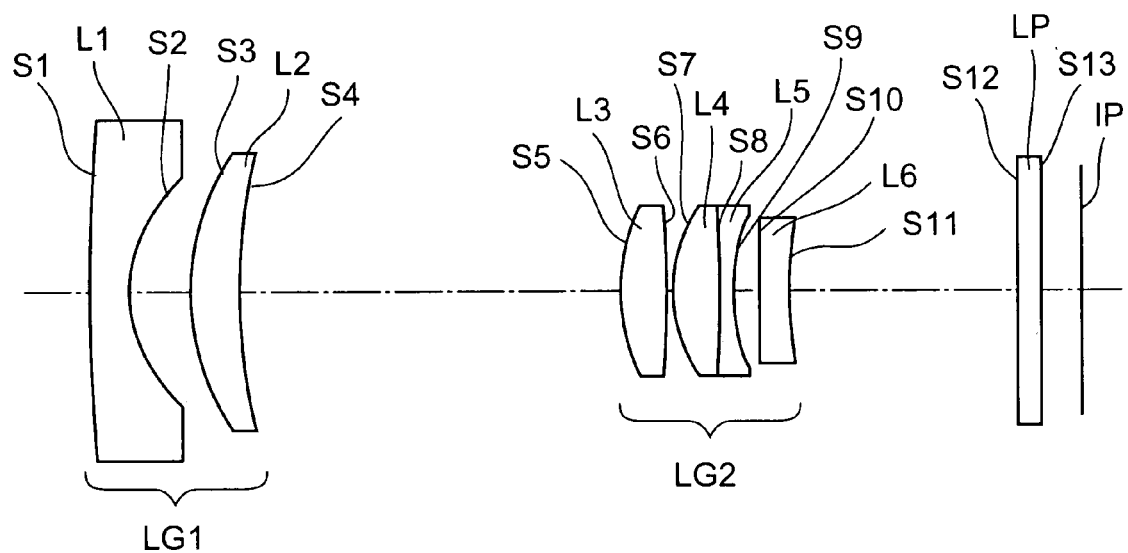
FIG. 9A shows a lens arrangement of the zoom lens system at the wide-angle extremity, according to a fifth embodiment of the present invention.
Figure 9B:
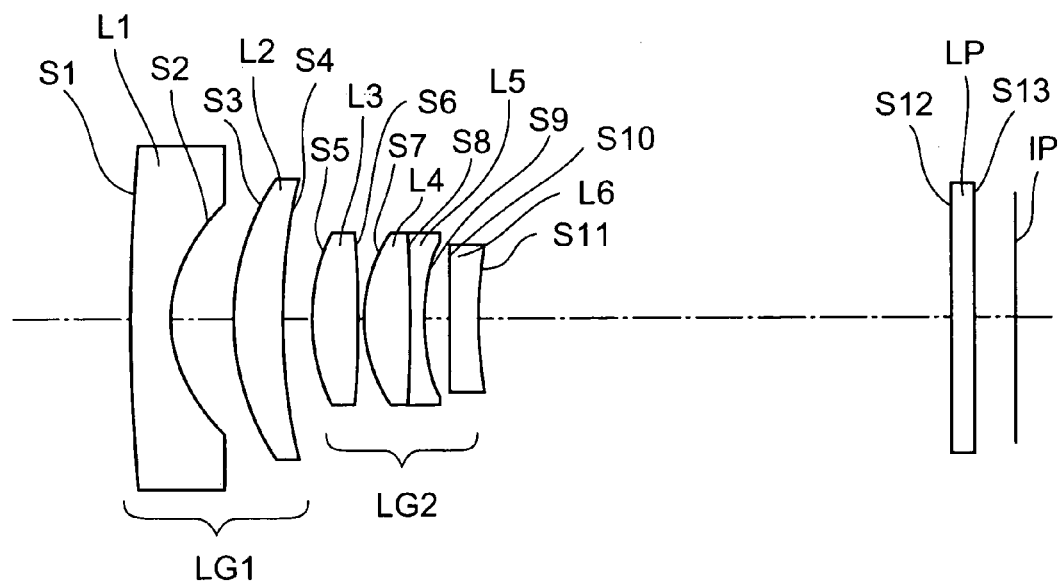
FIG. 9B shows a lens arrangement of the zoom lens system at the telephoto extremity, according to the fifth embodiment of the present invention.
Figure 10A:
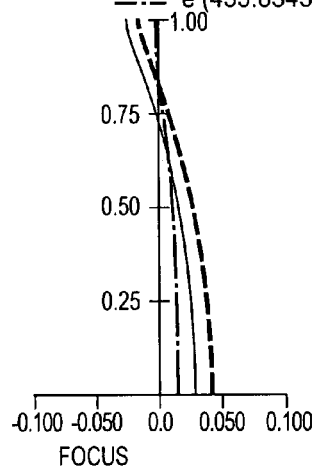
FIGS. 10A, 10B, 10C, 10D, 10E and 10F show various aberrations occurred in the zoom lens system of the fifth embodiment.
Figure 10B:
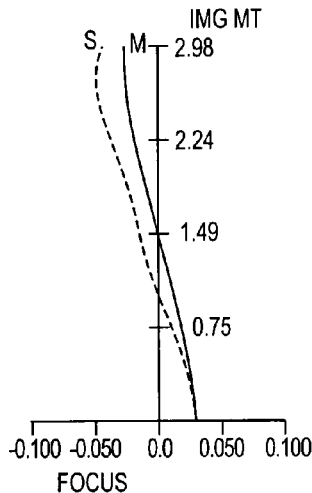
Figure 10C:
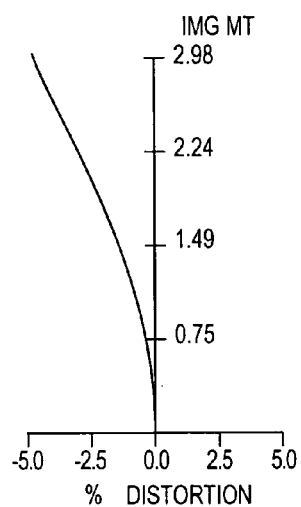
Figure 10D:
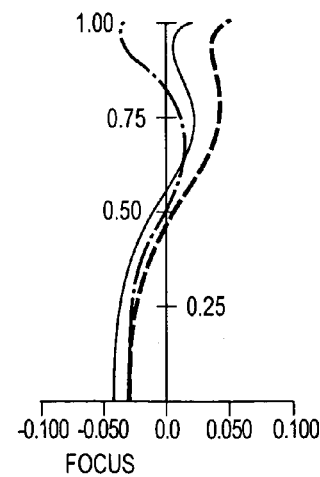
Figure 10E:
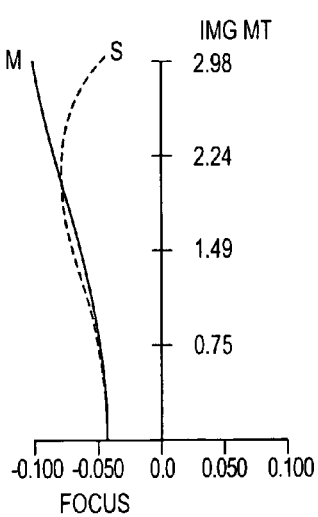
Figure 10F:
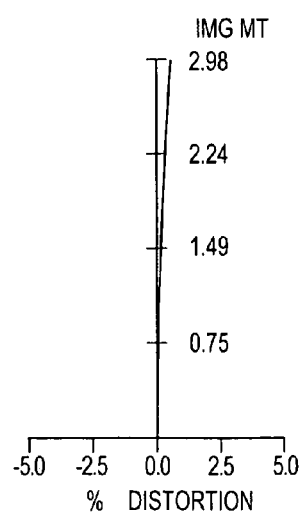

The numerical values of the fifth embodiment are shown in Table 5. FIG. 9A shows a lens arrangement of the zoom lens system at the wide-angle extremity. FIG. 9B shows a lens arrangement of the zoom lens system at the telephoto extremity. FIGS. 10A, 10B, 10C, 10D, 10E and 10F show various aberrations occurred in the zoom lens system of the fifth embodiment.

TABLE 5 f = 4.75~7.95~12.82
$F_{NO}$ = 3.09~3.89~5.11
2ω = 67.02°~41.20°~26.00°
$b_f$ = 7.212~9.631~13.345

| Surf. No. | R | D | $n_d$ | $v_d$ |
|---|---|---|---|---|
| 1 | 39.5169 | 1.000 | 1.80025 | 40.80 |
| 2* | 3.6880 | 1.654 | — | — |
| 3 | 6.6959 | 1.248 | 1.84666 | 23.79 |
| 4 | 14.4980 | 9.547~3.900~0.725 | — | — |
| 5 | 5.0957 | 1.139 | 1.61800 | 63.33 |
| 6 | 7097.5990 | 0.150 | — | — |
| 7 | 3.9490 | 1.170 | 1.61800 | 63.33 |
| 8 | −47.1643 | 0.400 | 2.08165 | 30.29 |
| 9 | 6.0943 | 0.571 | — | — |
| 10* | −42.0791 | 0.786 | 1.67407 | 55.00 |
| 11* | −26.7331 | 5.769~8.187~11.901 | — | — |

TABLE 5-continued f = 4.75~7.95~12.82
$F_{NO}$ = 3.09~3.89~5.11
2ω = 67.02°~41.20°~26.00°
$b_f$ = 7.212~9.631~13.345

| Surf. No. | R | D | $n_d$ | $v_d$ |
|---|---|---|---|---|
| 12 | ∞ | 0.591 | 1.50000 | 64.00 |
| 13 | ∞ | 1.050 | — | — |

*designates the aspherical surface which is rotationally symmetrical with respect to the optical axis.

Aspherical surface data (the aspherical surface coefficients not indicated are zero (0.00)):

| Surf. No. | K | $A_4$ | $A_6$ | $A_8$ | $A_{10}$ |
|---|---|---|---|---|---|
| 2 | −2.2064 | $4.1306 \times 10^{-3}$ | $-8.3484 \times 10^{-5}$ | $2.0876 \times 10^{-6}$ | $1.3820 \times 10^{-8}$ |
| 10 | −1 | $7.6989 \times 10^{-3}$ | $1.2038 \times 10^{-3}$ | $2.5461 \times 10^{-5}$ | $-5.5427 \times 10^{-5}$ |
| 11 | −1 | $1.2474 \times 10^{-2}$ | $1.9681 \times 10^{-3}$ | $6.1522 \times 10^{-5}$ | $-4.3647 \times 10^{-5}$ |

Table 6 shows the numerical values of first through fifth embodiments with respect to conditions (1) through (11).

TABLE 6

|  | Embod. 1 | Embod. 2 | Embod. 3 | Embod. 4 | Embod. 5 |
|---|---|---|---|---|---|
| Cond. (1) | 1.63 | 1.64 | 1.69 | 1.61 | 1.71 |
| Cond. (2) | 0.69 | 0.69 | 0.68 | 0.70 | 0.67 |
| Cond. (3) | −0.99 | −0.99 | −0.94 | −1.00 | −0.92 |
| Cond. (4) | 17.0 | 17.0 | 17.0 | 17.0 | 17.0 |
| Cond. (5) | 1.85 | 1.85 | 1.85 | 1.85 | 1.85 |
| Cond. (6) | 1.36 | 1.36 | 1.32 | 1.37 | 1.29 |
| Cond. (7) | 35.5 | 35.5 | 37.6 | 33.5 | 33.0 |
| Cond. (8) | 1.59 | 1.59 | 1.53 | 1.57 | 1.62 |
| Cond. (9) | 0.77 | 0.77 | 0.73 | 0.69 | 0.58 |
| Cond. (10) | 1.23 | 1.23 | 1.14 | 1.16 | 0.93 |
| Cond. (11) | 1.28 | 1.26 | 1.15 | 1.32 | 0.84 |

As can be understood from Table 6, the numerical values of each embodiment satisfy conditions (1) through (11). Furthermore, as can be understood from the aberration diagrams, the various aberrations are adequately corrected.

The fifth lens element L5 of the positive second lens group LG2 in the first, second ant fifth embodiments is made of transparent ceramics which has been disclosed in, e.g., Japanese Unexamined Patent Publication No. 2004-43194.

According to the above description, by effectively providing at least one aspherical surface, a zoom lens system, which has higher resolution and minimum distortion, and which is compact during use and also in a retracted state, can be achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group and a positive second lens group, in this order from an object, wherein said negative first lens group comprises a negative meniscus first lens element having the convex surface facing toward the object, and a positive meniscus second lens element having the convex surface facing toward the object, in this order from the object;

wherein said positive second lens group comprises a positive third lens element having a smaller radius of curvature on the object-side surface thereof, a positive fourth lens element, a negative fifth lens element that is cemented to said positive fourth lens element, and a sixth lens element having a weaker refractive power, in this order from the object;

wherein zooming is performed by moving said negative first lens group and said positive second lens group along the optical axis of said zoom lens system; and wherein said zoom lens system satisfies conditions (1) and (2) with respect to the length thereof along the optical axis:

$$TL/f_W < 1.9 \quad (1)$$

$$0.6 < f_W/f_{II} < 0.77 \quad (2)$$

wherein

TL designates the sum of the length of said negative first lens group and that of said positive second lens group;

$f_W$ designates the combined focal length of said zoom lens system at the wide-angle extremity; and $f_{II}$ designates the focal length of said positive second lens group.

2. The zoom lens system according to claim 1, wherein the image-side surface of said negative first lens element comprises an aspherical surface.

3. The zoom lens system according to claim 1, wherein said negative fifth lens element is made of transparent ceramics.

4. The zoom lens system according to claim 1, wherein said negative first lens element of said negative first lens group satisfies condition (3) with respect to a refractive power of the negative first lens element;

wherein said negative first lens element and said positive second lens element satisfy conditions (4) and (5) with respect to lens materials thereof;

wherein said negative first lens element of said negative first lens group satisfies condition (6) with respect to an image-side surface of said negative first lens element:

$$-1.1 < f_W/f_1 < -0.8 \quad (3)$$

$$10 < v_1 - v_2 \quad (4)$$

$$1.66 < n_2 \quad (5)$$

$$1.16 < f_W/R_2 < 1.51 \quad (6)$$

wherein $f_W$ designates the combined focal length of said zoom lens system at the wide-angle extremity;

$f_1$ designates the focal length of said negative first lens element;

$v_1$ designates the Abbe number of said negative first lens element;

$v_2$ designates the Abbe number of said positive second lens element;

$n_2$ designates the refractive index, with respect to the d-line, of said positive second lens element; and $R_2$ designates the radius of curvature of said image-side surface of said negative first lens element.

5. The zoom lens system according to claim 4, wherein said image-side surface of said negative first lens element comprises an aspherical surface.

6. The zoom lens system according to claim 4, wherein said negative fifth lens element is made of transparent ceramics.

7. The zoom lens system according to claim 1, wherein said positive third lens element of said positive second lens group satisfies conditions (7) and (8) with respect to lens materials thereof;

wherein said positive third lens element of said positive second lens group satisfies condition (9) with respect to a refractive power thereof;

wherein said positive third lens element of said positive second lens group satisfies condition (10) with respect to an object-side surface of said positive third lens element; and wherein said positive third lens element and said negative fifth lens element of said negative second lens group satisfy condition (11) with respect to said object-side surface of said positive third lens element and an image-side surface of said negative fifth lens element:

$$29.7 < (v_3+v_4)/2 - v_5 \quad (7)$$

$$1.45 < (n_3+n_4)/2 < 1.78 \quad (8)$$

$$0.5 < f_W/f_3 < 0.85 \quad (9)$$

$$0.8 < f_W/R_5 < 1.45 \quad (10)$$

$$0.75 < R_5/R_9 < 1.45 \quad (11)$$

wherein $v_3$ designates the Abbe number of said positive third lens element;

$v_4$ designates the Abbe number of said positive fourth element;

$n_3$ designates the refractive index, with respect to the d-line, of said positive third lens element;

$n_4$ designates the refractive index, with respect to the d-line, of said positive fourth lens element;

$f_W$ designates the combined focal length of said zoom lens system at the wide-angle extremity;

$f_3$ designates the focal length of said positive third lens element;

$R_5$ designates the radius of curvature of said object-side surface of said positive third lens element; and $R_9$ designates the radius of curvature of said image-side surface of said negative fifth lens element.

8. The zoom lens system according to claim 7, wherein at least two surfaces of lens elements constituting said positive second lens group comprise aspherical surfaces.

9. The zoom lens system according to claim 7, wherein said negative fifth lens element is made of transparent ceramics.

* * * * *

UNITED STATES PATENT AND TRADEMARK OFFICE
CERTIFICATE OF CORRECTION

| | |
|---|---|
| PATENT NO. | : 7,054,072 B2 |
| APPLICATION NO. | : 11/045467 |
| DATED | : May 30, 2006 |
| INVENTOR(S) | : Makoto Sato |

It is certified that error appears in the above-identified patent and that said Letters Patent is hereby corrected as shown below:

On the Title page:

Under Item (30) Foreign Application Priority Data, line 3;

change "Sep. 24, 2004 (JP) ........... 2004-273613"

to --Sep. 24, 2004 (JP) .......... 2004-276310--.

Signed and Sealed this
Fifth Day of June, 2012

David J. Kappos
*Director of the United States Patent and Trademark Office*